Dec. 9, 1947.   A. J. HORNFECK   2,432,422
ELECTRICAL MEASURING SYSTEM
Filed Aug. 3, 1942   6 Sheets-Sheet 1

Inventor
ANTHONY J. HORNFECK
By Raymond D. Jenkins
Attorney

Dec. 9, 1947.  A. J. HORNFECK  2,432,422
ELECTRICAL MEASURING SYSTEM
Filed Aug. 3, 1942  6 Sheets-Sheet 2

Inventor
ANTHONY J. HORNFECK
Raymond D. Jenkins
Attorney

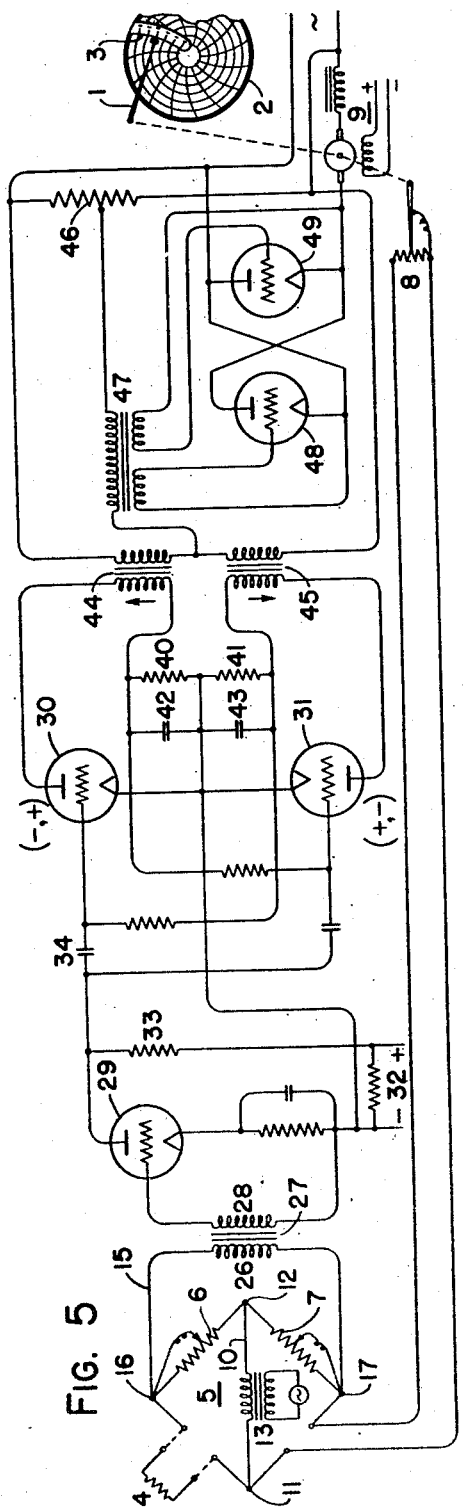
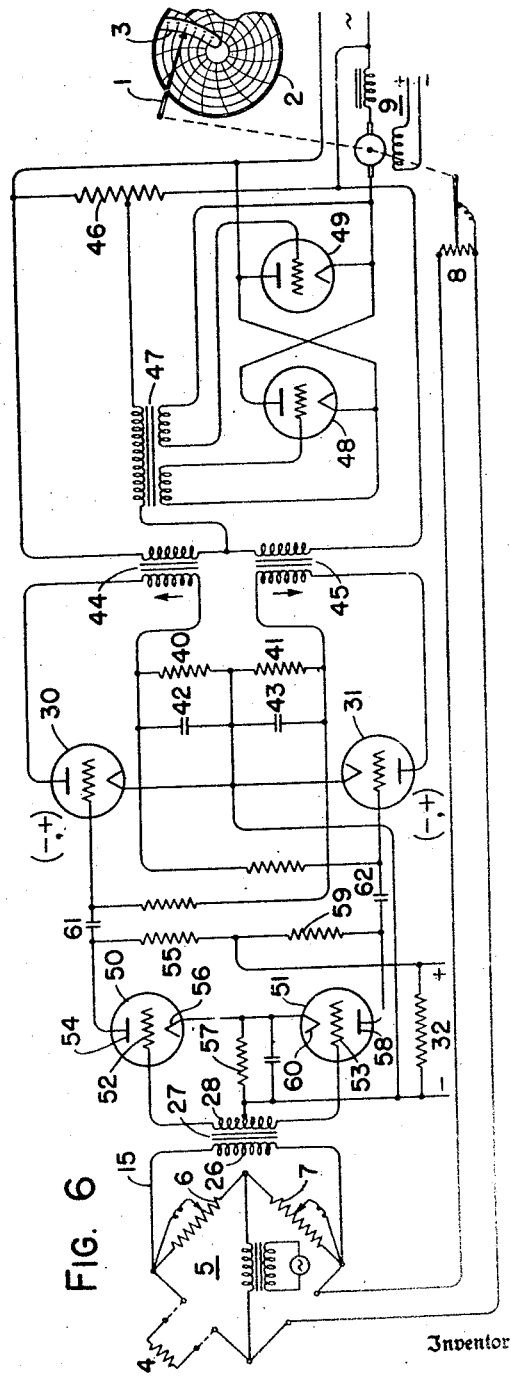
FIG. 5
FIG. 6
Inventor
ANTHONY J. HORNFECK
Raymond W. Jenkins
Attorney Inventor
ANTHONY J. HORNFECK
By Raymond D. Junkins
Attorney

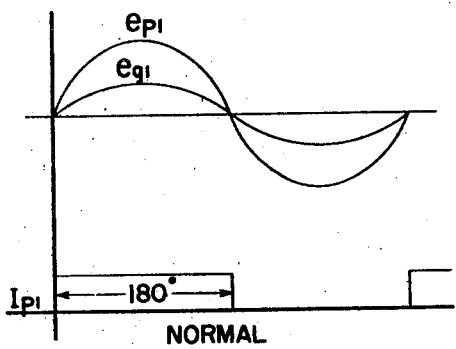
FIG. 11 NORMAL
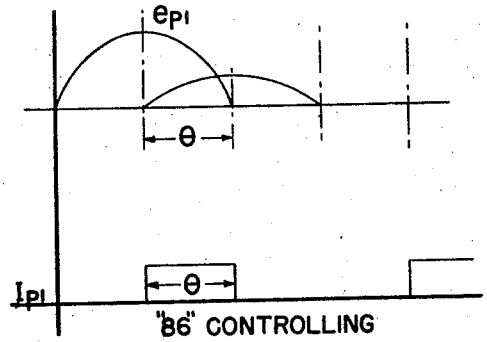
FIG. 12 "θ" CONTROLLING
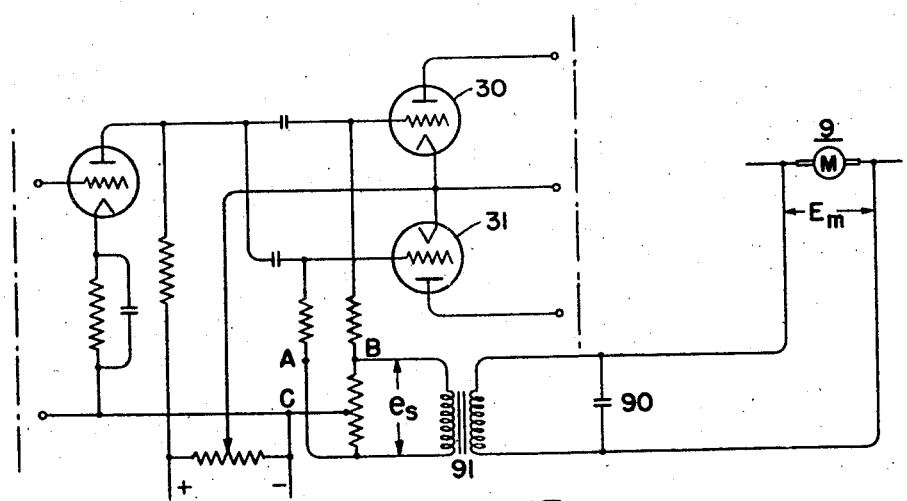
FIG. 13
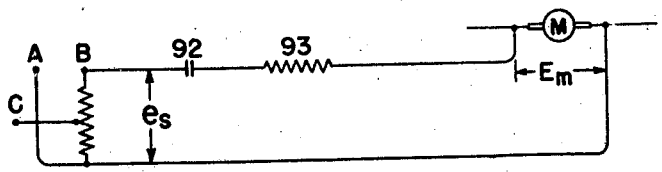
FIG 14
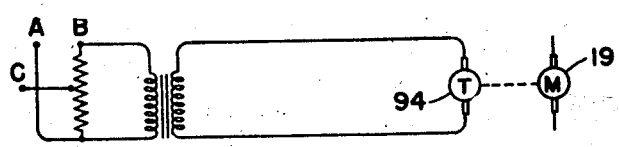
FIG. 15
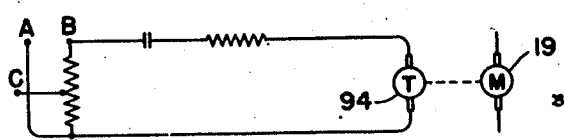
FIG. 16
Inventor
ANTHONY J. HORNFECK
By Raymond W. Jenkins
Attorney Dec. 9, 1947.  A. J. HORNFECK  2,432,422
ELECTRICAL MEASURING SYSTEM
Filed Aug. 3, 1942  6 Sheets-Sheet 6

Inventor
ANTHONY J. HORNFECK
By Raymond W. Jenkins
Attorney

Patented Dec. 9, 1947

2,432,422

UNITED STATES PATENT OFFICE 2,432,422

ELECTRICAL MEASURING SYSTEM

Anthony J. Hornfeck, Cleveland Heights, Ohio, assignor to Bailey Meter Company, a corporation of Delaware Application August 3, 1942, Serial No. 453,485

19 Claims. (Cl. 318—29)

This invention relates to apparatus and electric circuits for exhibiting and/or controlling the magnitude of a variable of a physical, chemical or electrical nature, such as pressure, temperature, rate of fluid flow, electromotive force, etc.

In accordance with my invention variations in a variable quantity or condition are translated into variations in an electrical effect, and this effect is then amplified solely through electrical means until sufficient power is available for doing useful work, such as moving an indicator or other exhibiting means, or for regulating the rate of application of an agent contributing to the production or maintenance of the variable.

In devices of the same general type at present known wherein variations in the variable are translated into variations in an electrical effect, the necessary amplification is done, at least in part, by mechanical means. There are, therefore, variations in magnitude of the variable translated into variations in an electrical effect, which are then translated into a corresponding mechanical movement, such as the deflection of a galvanometer, and thence usually the mechanical movement is translated back into an electrical effect for operating the exhibiting or control device. Because of the small power available in the first electrical effect, such devices usually operate on the step by step principle. That is to say, on a change in the variable the exhibiting or control device is not continuously operated in correspondence with such change, but periodically by means of a feeler mechanism the exhibiting or control device is changed an amount corresponding to the amount of change in the variable during succeeding increments of time. Such a device is disclosed in Patent 2,015,968 to Ryder.

It is evident that such devices are necessarily complicated and delicate and do not correctly exhibit the variable during transient periods. My invention is particularly concerned with the elimination of all mechanical movements between the sensitive device and the exhibiting or control power device, leading to simplification and removal of the usual time delay, so that the device accurately exhibits the magnitude of the variable even during transient periods. It is evident that many ancillary advantages will follow, among which may be mentioned as obvious the elimination of wear of mechanical parts and elimination of the necessity for periodic inspection and adjustment to correct for inaccuracies occasioned by mechanical wear. For a complete understanding of my invention, reference should be made to the description which follows, and to the drawings in which:

Figs. 4, 5, 6, 7, 8, 9 and 10 are diagrammatic arrangements embodying the invention of Fig. 1.

Figs. 11 and 12 are graphs relating to Fig. 10.

Figs. 13, 14, 15 and 16 are anti-hunting circuits adaptable to the previous arrangements.

Figure 1:
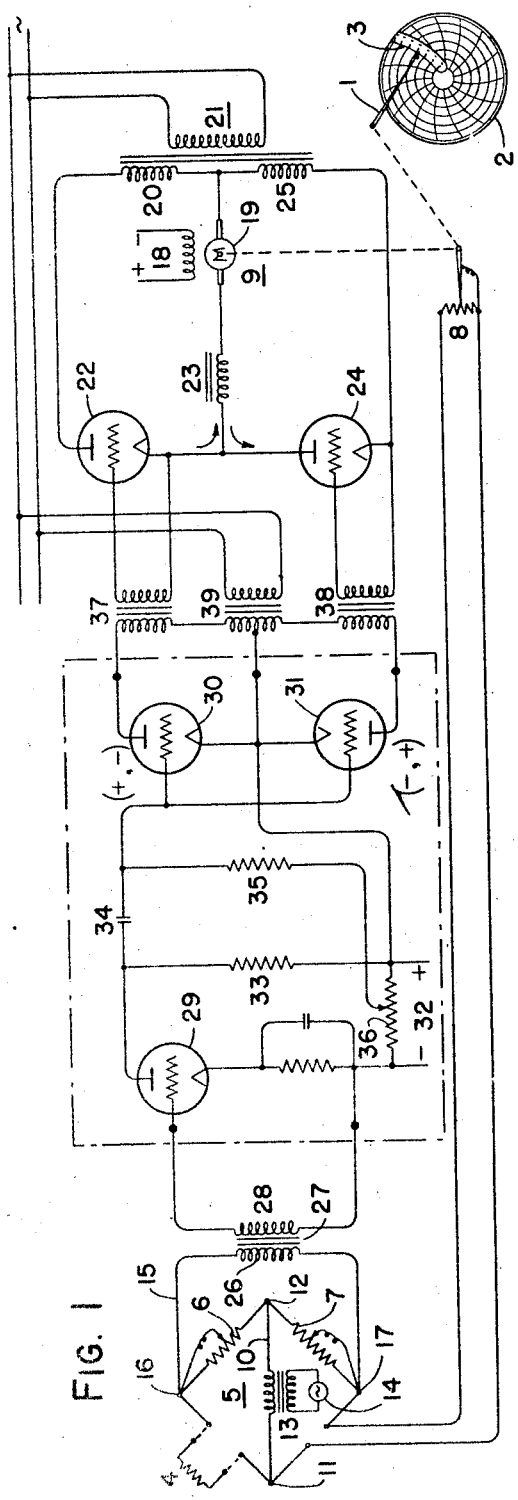
Fig. 1 is a diagrammatic arrangement of apparatus and electric circuit embodying my invention.

Referring now in particular to Fig. 1, I have illustrated therein my invention arranged to visually exhibit, by means of a movable index 1 and cooperating time revoluble chart 2 and scale 3, the magnitude of a variable impedance 4. The index, chart and scale are merely specific forms of exhibiting means which may take a wide variety of other forms, as will be evident to those skilled in the art. The variable impedance 4 is shown specifically as a resistance which may be made sensitive to a variable, such as temperature for example, which it is desired to visually exhibit. It is evident, however, as will be pointed out in greater detail hereinafter, that the impedance to which the apparatus is responsive may be made sensitive to any variable condition, quantity, or quality which it is desired to measure and/or control. Broadly, therefore, my invention contemplates the use of any impedance, such as a resistance, condenser, inductance, or the like, which may be used to produce an electrical effect varying in correspondence with the variable which it is desired to measure and/or control.

To provide an accurate and sensitive measuring system, I preferably employ the null or zero balance method wherein a variable effect of measurable value is maintained equal to or in some predetermined proportion to the electrical effect produced by the variable, and hence becomes a measure of the variable. In the embodiment shown in Fig. 1, I employ an alternating current Wheatstone bridge generally indicated at 5, and having as arms the resistance 4 and adjustable resistances 6, 7 and 8. Resistance 8, which is moved in consonance with the index 1 by a motor 9, is the balancing resistance and through means hereinafter described is continuously varied to maintain the bridge in balance, and hence the magnitude thereof becomes a measure of the resistance 4, and inferentially of the variable to which the latter is sensitive.

The bridge 5 is provided with a conjugate conductor 10 connecting diagonally opposite points 11 and 12 of the bridge, and which is inductively coupled through a transformer 13 to a source of alternating current 14. A second conjugate conductor 15 is connected across the remaining diagonally opposite points 16 and 17 of the bridge. Assuming the bridge to be in balance, no current will pass through the conjugate conductor 15 as points 16 and 17 will be at equal potential. If now, due to a change in the variable, the resistance 4 is increased, a difference in potential will exist between points 16 and 17 and current will flow through the conjugate conductor 15. This current will have a certain polarity or phase relation with respect to the source 14. If the bridge is unbalanced by a decrease in the resistance 4, a current of opposite polarity or phase with respect to the source 14 will flow through the conjugate conductor 15. By means hereinafter to be described, I employ this change in polarity or phase of the current in the conjugate conductor 15, with respect to the polarity or phase of the current produced by the source 14, to selectively operate the motor 9 in one direction or another to vary the resistance 8 in proper sense to maintain the Wheatstone bridge 5 in balance.

The motor 9 is a shunt D.-C. motor having a continuously energized direct current shunt winding 18 and an armature rotor 19; the armature being connected in a double loop circuit. One loop includes (in the direction of current flow) the armature 19, secondary 20 of transformer 21, electron discharge device 22, and choke 23, to the armature. The second loop includes (in the direction of current flow) the armature 19, choke 23, electron discharge device 24, and secondary 25 of the transformer 21, to the armature. The devices or tubes 22, 24 are preferably of the gas-filled type adapted to be turned on and off like a relay and may be of the known Thyratron type.

When tube 22 is conducting it passes one half of the alternating current wave from the transformer secondary 20 through the armature 19, providing unidirectional pulsating direct current which is further smoothed out by the choke 23, and causing the motor rotor 19 to turn in one direction. When only the tube 24 is conducting (the tubes 22 and 24 being oppositely connected) the rotor 19 turns in opposite direction under the impulse of the unidirectional pulsating direct current flowing through the armature in opposite direction, due to the fact that tube 24 passes only the other half wave of the alternating current. Thus the motor 9 is reversed by causing one or the other of tubes 22 and 24 to be conducting. If both tubes are conducting, or if both tubes are non-conducting, the motor does not rotate.

The circuit can be arranged so that tubes 22 and 24 are either to be turned on or to be turned off. If both tubes are normally non-conducting, then the turning on of one tube results in rotation of the motor in predetermined direction. Turning that tube off results in deenergization of the armature. If both tubes are normally conducting, then the turning off of one tube results in rotation of the motor in predetermined direction; and the turning on of that tube plugs the motor to a stop without appreciable overtravel or drift.

Upon an unbalance of the bridge 5, the particular tube (22 or 24) which is rendered conducting to produce rotation of the rotor 19 is determined by the polarity or phase of the current in the conjugate conductor 15. Rotation of the rotor 19 will vary the resistance 8 in proper direction to restore the bridge to balance. It is evident that upon a slight change in the resistance 4 the current in the conjugate conductor 15 will be of relatively small magnitude. So that such minute current may be used to control the selective turning on or off of the tubes 22, 24, I provide electrical amplifying means; shown in Fig. 1, in the block bounded by the dot-dash line.

Connected in the conjugate conductor 15 is the primary 26 of a transformer 27 having a secondary 28 connected in the input circuit of an electron discharge device 29 for controlling the motor control tubes 30, 31. The tubes 30, 31 are preferably arranged in circuit to have opposite polarity, that is the anode of the tube 30 is positive during one-half cycle and the anode of the tube 31 is positive during the remaining half cycle. Unbalance of the bridge in one sense will then produce a current of the same polarity as the tube 30 for example, effecting rotation of the motor 9 in one direction. Unbalance of the bridge in opposite direction will produce a current having the same polarity as the tube 31 and accordingly will effect rotation of the motor 9 in opposite direction.

The output circuit of the device 29 is shown as including a source of direct current 32 and a resistance 33. The grid of the device 29 may be biased so that it is nonconducting or is conducting a predetermined amount. Such direct current as normally flows through the output circuit of the device 29 has no effect upon the potential impressed upon the grids of the tubes 30 and 31, by virtue of a condenser 34. Upon passage of alternating current through the conjugate conductor 15 however, the current in the output circuit of the device 29 becomes pulsating in character, which will pass through the condenser 34 and render either the tube 30 or the tube 31 conducting selectively in accordance with the sense of unbalance of the bridge 5.

The tubes 30 and 31 may normally be maintained non-conducting. This is accomplished by connecting the grids through a resistance 35 to a voltage divider 36. To provide a high degree of sensitivity in some cases it may be preferable to maintain the tubes 30 and 31 normally conducting, in which case the pulsating current originating due to unbalance of the bridge 5 will selectively render one or the other of the tubes more conducting.

As hereinbefore stated, the polarity of the current in the conjugate conductor 15 depends upon the sense of change in the resistance 4. Likewise the polarity of the current in the output circuit of the device 29 will depend upon the sense of change in the resistance 4. The pulsating current passing through the output circuit of the device 29 is utilized to control the current transmission through the pair of electron discharge devices or motor control tubes 30 and 31, the output circuits of which are inductively coupled through transformers 37 and 38 to the tubes 22 and 24 respectively. The transformer 39 is the plate supply transformer for the devices 30 and 31. The transformers 37 and 38 are grid control transformers for the thyratrons 22 and 24, while as previously mentioned transformer 21 is the plate supply transformer for the thyratrons 22 and 24. Upon the tube 30 being rendered conducting, a voltage appears on the secondary of transformer 37 and is applied to the grid of tube 22. This voltage can be made to turn the tube 22 either on or off, thus causing rotation of the motor 9 in predetermined direction. Likewise when the tube 31 is conducting, a voltage from the secondary of the transformer 38 turns the tube 24 on or off, thereby causing rotation of the motor 9 in opposite direction. As previously mentioned, the tubes 22, 24 and their circuits may be arranged so that one of them is to be turned on for motor rotation in predetermined direction, or the circuit may be so arranged that one of the tubes is turned off for motor rotation in predetermined direction. As shown in Fig. 1, I preferably arrange the devices 30, 31 so that they are of opposite polarity.

The pulsating component of the current in the output circuit of the device 29 is impressed upon the grids of the tubes 30 and 31 through a condenser 34, which inhibits the passage of direct current. It will, therefore, be solely the component of the current in the output circuit of the device 29, produced by the flow of current in the conjugate conductor 15, which will be effective for controlling the grid-cathode potential relationship of the tubes 30 and 31. As the tubes 30 and 31 have opposite polarity the particular tube rendered conducting during each half cycle when the proper anode-cathode potential relationship exists will be determined by the polarity of the current passing through the conductor 15. The particular armature loop circuit of the motor 9 which is energized upon unbalance of the bridge is then selectively determined in dependence upon the sense of unbalance of the bridge. As heretofore described, operation of the motor 9 serves to position the index 1 and also to vary the balancing resistance 8 to restore the bridge 5 to balance. As is well understood, the magnitude of the resistance 8, and accordingly the position of the index 1, is a measure of the magnitude of the resistance 4, and accordingly of the variable to which the latter is responsive.

Figure 3:
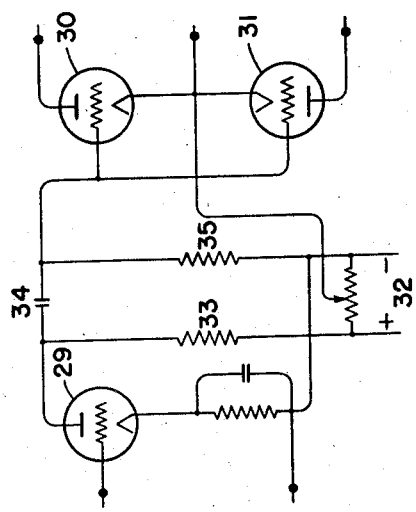
Figs. 2 and 3 illustrate slight modifications of a portion of the circuit of Fig. 1.
Figure 2:
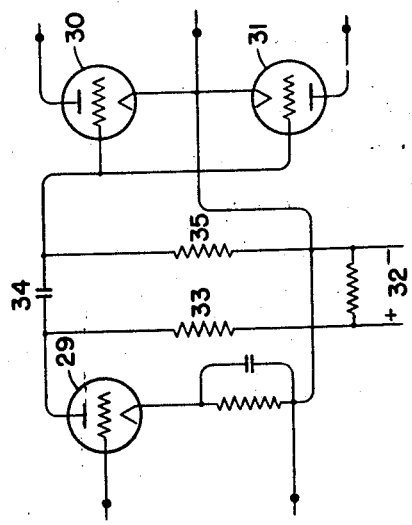

In Figs. 2 and 3 I show slight modifications of a portion of the circuit of Fig. 1, which modifications are desirable under certain conditions of operation.

A particular function of the bridge output transformer 27 is to match the high impedance of the grid input circuit to the low impedance of the bridge. In this way the voltage unbalance of the bridge can be increased several times and increased sensitivity obtained. In the measurement of certain small ranges in temperature for example, resulting in small voltage and current values and changes in value in the bridge 5, it is desirable to use the bridge output transformer 27. One feature of the present invention, however, is a modification of the circuit arrangement of Fig. 1, whereby the relatively expensive transformer 27 may be eliminated. Such an arrangement I have illustrated in Fig. 4, wherein the sensitivity of the measuring circuit has been materially increased, even though the amplifying transformer 27 has been eliminated.

In general (referring to Fig. 4) I materially increase the sensitivity obtained from the motor control tubes 30, 31 by means of a feed-back of voltage from output to input. When an alternating current voltage is applied to the input of the motor control tubes 30, 31, the plate current of one tube is increased and the plate current of the other tube is decreased. Since the armature loop circuits are equally energized or equally de-energized in equilibrium condition, the change in plate currents upsets this equilibrium condition and the motor rotates. Now if by some means the increased plate current of the one tube could be used to cause the plate current of the other tube to decrease still further, then increased sensitivity would result. A given input voltage would then produce a greater plate current differential between the two tubes 30, 31, and this is exactly what I accomplish by the circuit shown in Fig. 4.

The input to the motor control tubes 30, 31 is split so that each tube has its own coupling condenser, grid resistor and bias circuit while still receiving all of the input signal. The grid bias, instead of being furnished by the power supply, is now supplied independently to each tube by the voltage drop across a resistor in the plate circuit of the other tube. These resistors 40, 41 are by-passed by condensers 42, 43 respectively.

At equilibrium each tube 30 or 31 has equal bias since the plate currents must adjust to equality in order to stop the motor. If tube 30 receives an input signal of such a polarity as to cause its plate current to increase, then the plate current of tube 31 will be decreased by the same signal. The increased plate current of tube 30 causes a greater voltage drop across its resistor, thereby applying a further negative voltage to the grid of the tube 31, reducing its plate current still further. A reverse input signal results in the opposite effect.

Figure 4:
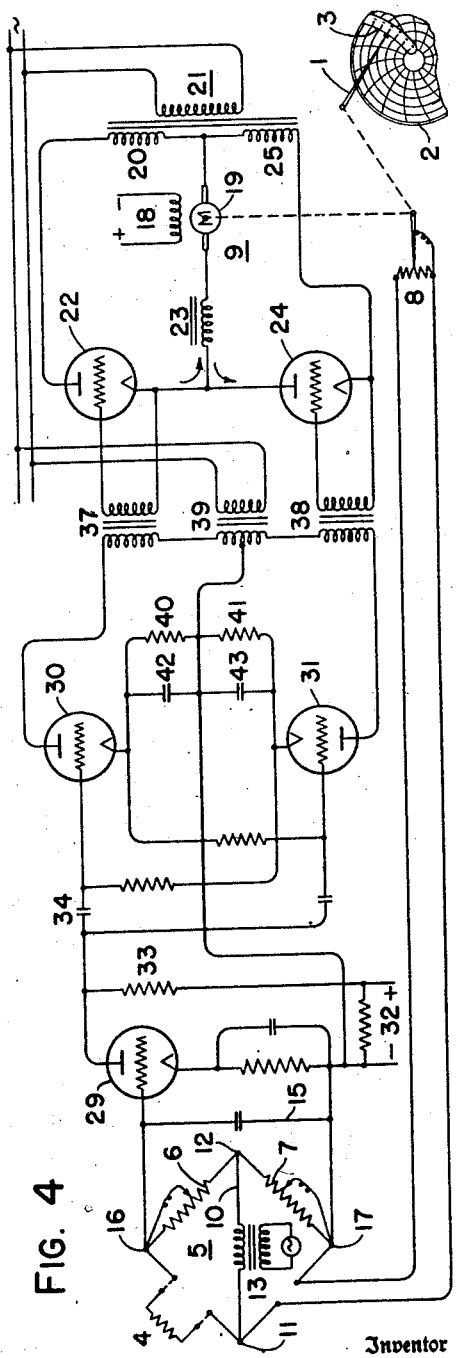

The circuit arrangement of Fig. 5 is in certain respects similar to that of Fig. 4 and is likewise directed to the directional rotation control of a shunt wound direct current motor 9. Additionally, however, the arrangement of Fig. 5 provides for speed adjustment of the motor as well as reversal of direction of rotation.

Transformers 44 and 45 are plate supply transformers for the tubes 30 and 31 respectively. 46 is a center tapped auto transformer or a divided resistance across the source of alternating current. At 47 I illustrate a grid supply transformer for the thyratrons 48 and 49.

When the motor control tube 30 conducts, a voltage of a certain phase relation appears on the grids of the thyratrons 48, 49. This will tend to turn one of the tubes 48, 49 off or the other tube on, causing motor rotation in desired direction. If the tubes 48 and 49 are normally conducting (no grid excitation) the motor will tend to come to a plugging or dead stop when the system is balanced.

The circuit of Fig. 6 is similar to that of Fig. 5 except for a modification toward the input end where the device 29 is replaced by a pair of electron discharge devices 50 and 51. Connected in the conjugate conductor 15 is the primary 26 of the transformer 27 having a secondary 28, the opposite terminals of which are connected to the grids 52 and 53 of the electron discharge devices 50 and 51 respectively. The device 50 has an output circuit which includes an anode 54 connected through a resistance 55 to one side of the direct current source 27, and a cathode 56 which is connected through a resistance 57 to a center tap in the secondary 28 and to the opposite side of the source 27. The output circuit arrangement of the device 51 is similar to that of the device 50. The anode 58 being connected through a resistance 59 to one side of the direct current source 27, whereas the cathode 60 is connected to the center tap of the secondary 28 and to the opposite side of the source 27 through the resistance 57.

Assuming that no current passes through the conjugate conductor 15, so that no voltage is induced in the secondary 28, it is evident that by proper circuit arrangements the devices 50 and 51 may be made to pass currents of predetermined magnitudes through their respective output circuits, or if desired the grids 52 and 53 may be sufficiently biased so that both devices are substantially non-conducting. Assuming now that alternating current is passing through the conjugate conductor 15, by virtue of the fact that the grid 53 is connected to the opposite terminal of the secondary 28 than is the grid 52, then when the grid 52 is being made more positive with respect to the cathode 56, the grid 53 is being made more negative with respect to the cathode 60. Upon a reversal of the alternating current in the conjugate conductor 15 the reverse will occur, the grid 53 then being made more positive with respect to the cathode 60 and the grid 52 being made more negative with respect to the cathode 56. With alternating current passing through the conjugate conductor 15 a pulsating current will therefore pass through the output circuits of the electron discharge devices 50 and 51 and, by virtue of the amplifying characteristics of the transformer 27 and of the devices 50 and 51, the voltage passing through the output circuits will be greater than that passing through the conjugate conductor 15. As hereinbefore stated, the polarity of the current in the conjugate conductor 15 depends upon the sense of change in the resistance 4. Likewise the polarity of the current in the output circuits of the devices 50 and 51 will depend upon the sense of change in the resistance 4.

The pulsating current passing through the output circuits of the devices 50 and 51 is utilized to control the current transmission through the motor control tubes 30 and 31, the output circuits of which are inductively coupled through transformers 44 and 45 to the circuits of the motor 9. When one or the other of the tubes 30, 31 is rendered conducting, the impedance of the related transformer 44 or 45 respectively is lowered thereby, causing the motor 9 to rotate in selected direction. The tubes 30 and 31 are preferably arranged so that they are of the same polarity, that is the anodes of the devices are simultaneously positive and negative with respect to their associated cathodes. During the half cycle when the anodes are positive, the devices may be rendered conducting or non-conducting by control of the grid or input circuits, as will be understood by those familiar with the art. When the anodes are negative with respect to their associated cathodes, the devices are substantially non-conducting regardless of the potential relation that may exist between the grid and cathode.

The pulsating component of the current in the output circuits of the devices 50 and 51 is impressed upon the grids of the tubes 30 and 31 through condensers 61 and 62 which inhibit the passage of direct current. It will, therefore, be solely the component of the current in the output circuit of the devices 50 and 51 produced by the flow of current in the conjugate conductor 15 which will be effective for controlling the grid-cathode potential relationship of the tubes 30 and 31. As the tubes 30 and 31 have the same polarity, the particular device rendered conducting each half cycle when the proper anode-cathode potential relation exists will be determined by the polarity of the current passing through the conductor 15. That is to say, upon unbalance of the bridge in one sense, the polarity of the current in the conjugate conductor 15 will be such that the grid of the tube 31 will be rendered positive during the half cycle when the anode thereof is positive with respect to its cathode, so that the device will be rendered conducting. If, however, the bridge has been unbalanced in the opposite direction, then during the same half cycle the grid of the tube 30 would have been rendered negative with respect to the potential of its cathode so that that tube would have remaining non-conducting. In the latter case, however, the grid of the tube 31 would have been rendered more positive with respect to the potential of the cathode, so that it would have been rendered conducting. The particular direction of rotation of the motor 9, upon unbalance of the bridge, is selectively determined therefor in dependence upon the sense of unbalance of the bridge. As hereinbefore described, the operation of the motor 9 serves to position the index 1 and also to vary the balancing resistance 8 to restore the bridge to balance.

Figure 7:
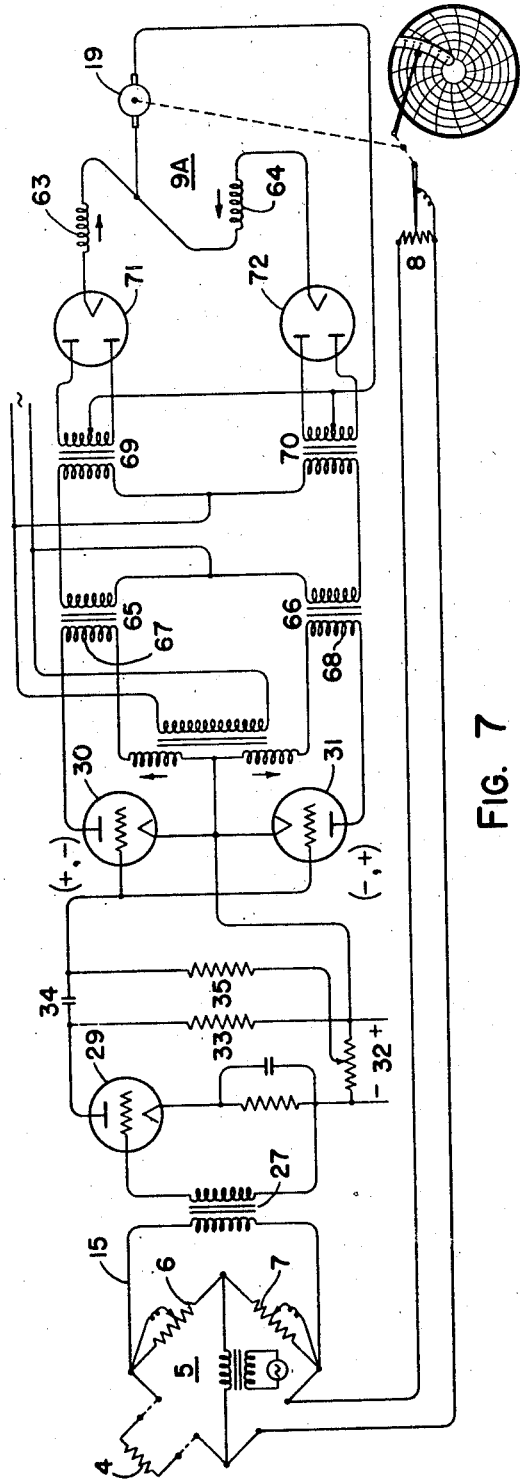

In Fig. 7 I illustrate an arrangement of electrical circuit for reversing and speed control of a series wound direct current motor 9A having an armature 19 and selectively energized opposed D. C. windings 63, 64. The devices 65 and 66 are saturable core reactors having saturating windings 67 and 68 respectively. The saturating windings 67, 68 are controlled as to saturation by variable plate current of the motor control tubes 30, 31. In other words, the saturating winding 67 is in the output circuit of the tube 30 and receives unidirectional pulsating direct current from the half wave of the alternating current which is passed by the tube 30 when the tube is conducting. In like manner the saturating winding 68 is in the output circuit of the tube 31 and receives unidirectional pulsating direct current when the tube 31 is conducting. Inasmuch as the tubes 30 and 31 will each pass only one half of the alternating current wave, and the various elements are properly connected, the flow through the saturating winding 67 is in one direction and the flow through the saturating winding 68 is in the other direction. The relative degree of saturation of the windings 67, 68 varies the relative impedance of the alternating current output windings of the saturable core reactors 65 and 66, which in turn varies the relative voltage applied to the primaries of the transformers 69, 70. 71 and 72 are gas rectifier tubes whose plate voltage is controlled by the saturable core reactors 65 and 66 through the transformers 69 and 70. The resulting control of the motor 9A is a rotation in one direction if direct current is flowing in series through the winding 63 and the armature 19; and a rotation of the motor in opposite direction if direct current is flowing through the winding 64 and the armature 19. The speed of rotation of the motor 9A, in selected direction, depends upon the extent of saturation of the saturable core reactor 65 or 66, one relative to the other.

Figure 8:
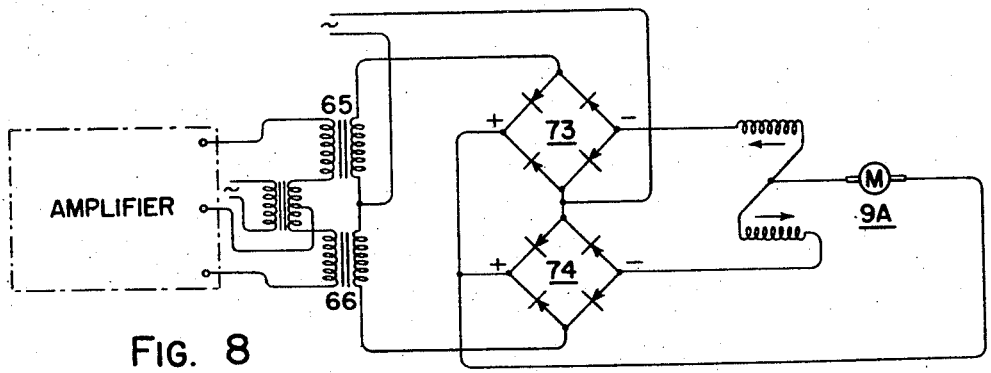

Fig. 8 is a modification of a portion of Fig. 7 providing the same basic reversing and speed control for the series wound direct current motor 9A as does the arrangement of Fig. 7, but accomplishing the control through copper oxide rectifiers 73 and 74 rather than the gas rectifier tubes 71 and 72. Also, in Fig. 8, the transformers 69 and 70 are unnecessary.

Figure 9:
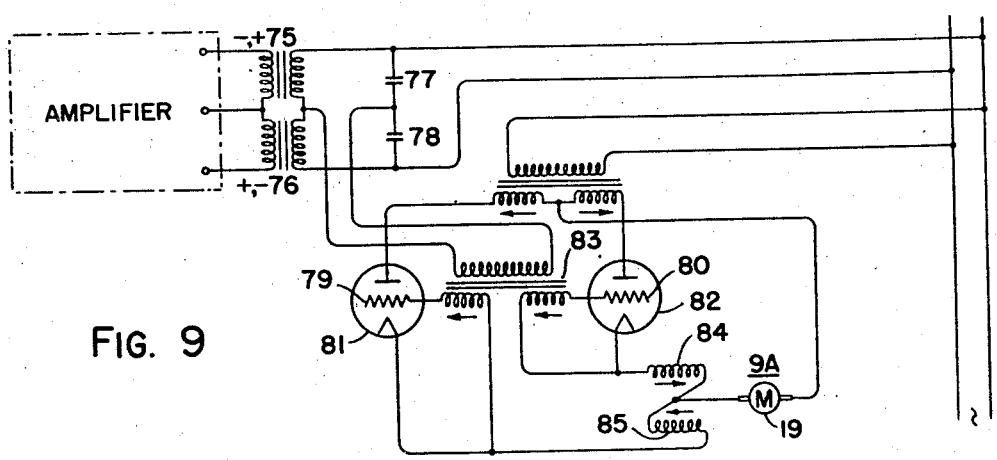

Fig. 9 is another modification of my invention in the control of a series wound direct current motor 9A. Transformers 75 and 76 are plate supply transformers for the motor control tubes 30 and 31 of the amplifier previously described. These transformers 75 and 76 together with condensers 77 and 78 form a phase shifting bridge. The output voltage of this bridge varies in phase and magnitude with the phase and magnitude of the input or loading on the secondaries of the transformers 75, 76. The output is applied to the grids 79 and 80 of the Thyratrons 81 and 82 through a transformer 83 to control the direction of rotation of the motor 9A by selectively energizing the opposing fields 84 or 85 and the armature 19 in series.

Figure 10:
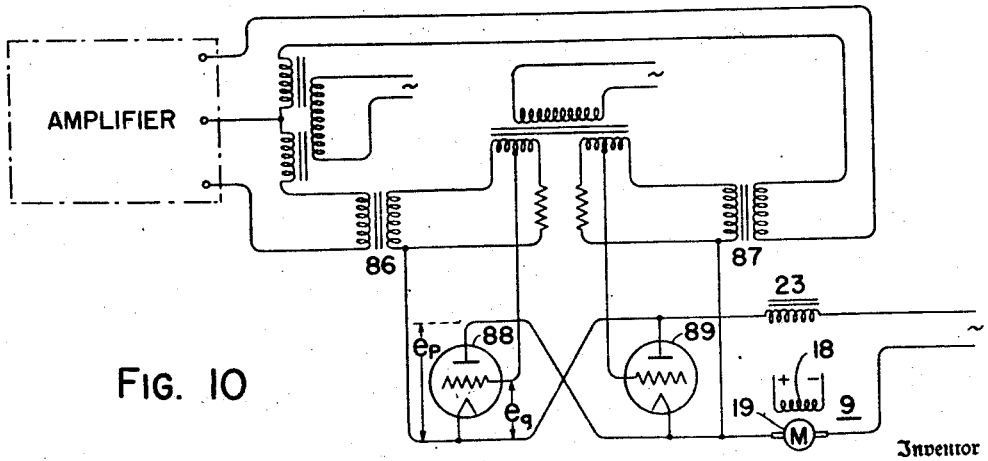

Fig. 10 is a modification of my invention in connection with the control for a shunt wound direct current motor 9 having an armature 19 and a direct current normally energized field winding 18. Direct current flowing through saturable core reactors 86 and 87 determines the grid voltage (both phase and magnitude) of the gas Thyratrons 88 and 89. The thyratrons 88 and 89 can be either normally off or normally on. If normally on, then a considerable braking action will be produced by the alternating current flowing through the motor at balance. Figs. 11 and 12 are graphs depicting electrical conditions and values pertinent to Fig. 10.

Figs. 13 and 14 illustrate anti-hunting circuits which can be incorporated into the complete circuits of Figs. 1, 4, 5, 6 or 10 previously described. Fig. 13 illustrates how the anti-hunting circuit, which is (on the drawing) to the right of the connection points A-B-C, may be connected into the general circuit of Fig. 1. A condenser 90 and a transformer 91 are connected in parallel across the armature of the motor 9. When the motor speed changes a change in voltage $E_m$ across the motor armature also occurs. Voltage $e_s$ is proportional to the rate of change of $E_m$ or the rate of change of speed. This produces a voltage on the grids of 30 and 31 to accentuate the change. This feed-back voltage will produce a motor torque proportional to the inertia force of the armature and in opposite direction.

Fig. 14 is similar to Fig. 13, but includes, in series, a condenser 92 and a resistance 93 rather than the condenser 90 and transformer 91 of Fig. 13.

Figs. 15 and 16 are similar anti-hunting feed-back circuits which may be added to or incorporated in the general circuit arrangements of Figs. 7, 8 and 9 previously described for the control of series connected direct current motors. In Figs. 15 and 16 it will be observed that the motor rotor 19 drives a pilot direct current tachometer 94 whose output is indicative of speed of the motor armature 19.

In Figs. 17, 18, 19, 20 and 21 I have depicted various applications to which the invention may be advantageously applied. In the figures previously described it will be observed that the resistance element 4 was described as a temperature sensitive device, or resistance thermometer, incorporated in a leg of an alternating current Wheatstone bridge. In other words, the element 4 constituted a variable impedance, specifically a resistance thermometer. In Figs. 17-21 inclusive I illustrate my invention applied to other measuring and controlling arrangements.

Figure 17:
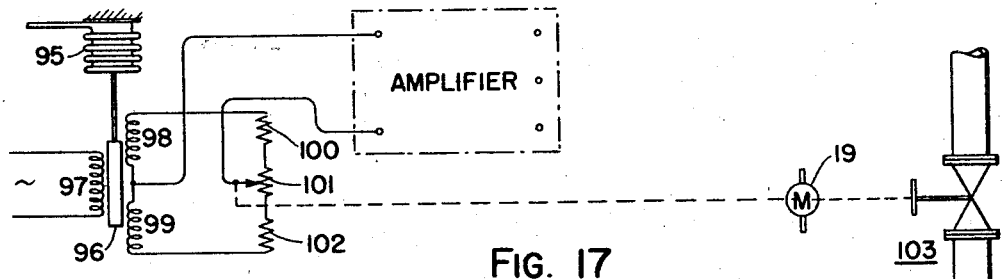
Figs. 17, 18, 19, 20 and 21 illustrate various applications of the invention.

In Fig. 17, for example, a pressure responsive bellows 95 is adapted to position a metallic core piece 96 relative to the windings of a mutual inductor bridge circuit having an alternating current coil 97 and two bridge coils 98, 99. The bridge further includes resistances 100, 101 and 102. Resistance 101 comprises the balancing resistance for the circuit and has a contact point adjustable by the motor armature 19. The armature 19 also may position a control valve 103 for regulating the pressure which is effective upon the bellows 95. In general, the arrangement is such that if the pressure within the bellows 95 deviates from optimum value, then the core piece 96 is moved relative to the windings 97, 98 and 99, thus unbalancing the impedance bridge. The sense and magnitude of such unbalance, applied to the amplifier, results in a positioning (through the agency of the circuit previously described) of the motor 19 which may be arranged to shift the balancing resistance 101 and at the same time position the regulating valve 103 so that the pressure is brought back to the optimum value and the bridge is rebalanced.

Figure 18:
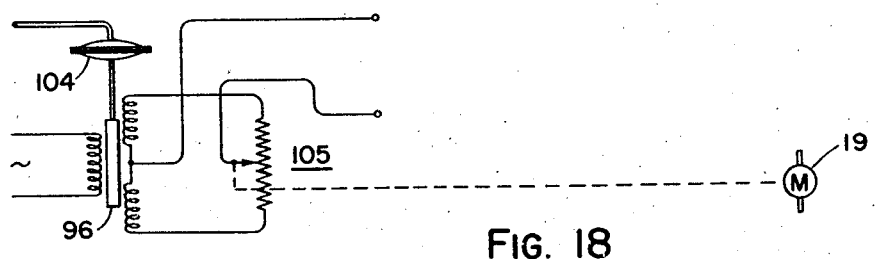

Fig. 18 illustrates a somewhat similar bridge system in which the core member 96 is positioned by a pressure responsive diaphragm or piston 104 and the rotor 19 positions the balancing contact along a resistance 105 to proportion said resistance 105 in the bridge circuit.

Figure 19:
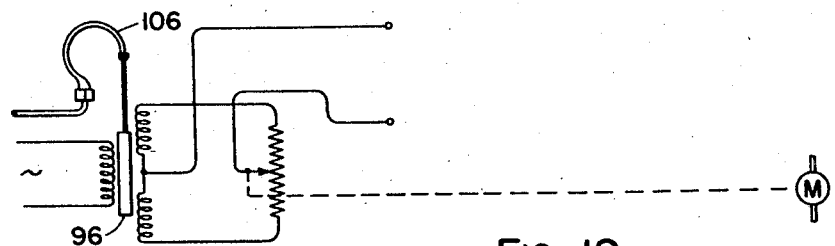

Fig. 19 is in general similar to Fig. 18 except that the core piece 96 is arranged to be positioned through the agency of a Bourdon tube 106, which is responsive to a fluid pressure. The fluid pressure acting upon the Bourdon tube 106 may equally as well be a pressure representative of a temperature value or temperature change, such as being an element of a gas-filled thermometer system.

Figure 20:
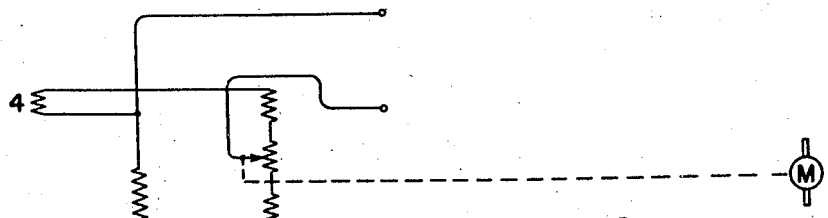

In Fig. 20 the variable impedance (resistance 4) is included in a resistance bridge of somewhat different arrangement than that of Fig. 1.

Figure 21:
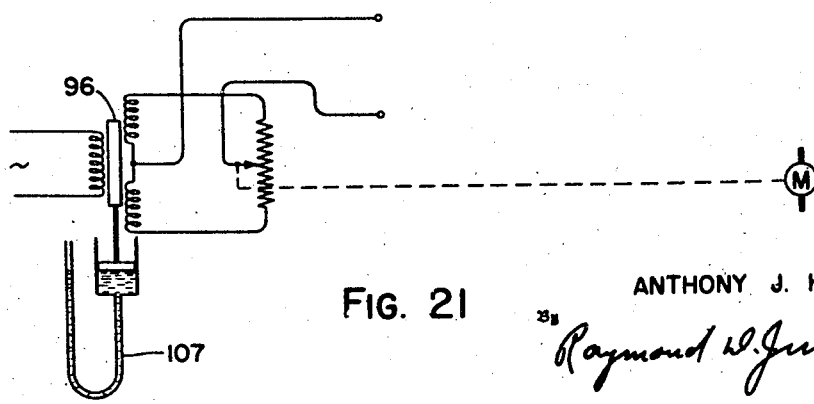

In Fig. 21 the core piece 96 is adapted to be positioned by a float in one leg of a U-tube or manometer 107 which may be a pressure sensitive element or a pressure differential sensitive device, such as a rate of fluid flow meter or level responsive device. Otherwise the circuit arrangement is similar to that shown in Fig. 18.

While I have illustrated and described certain preferred embodiments of my invention and certain preferred applications to which the invention may be adapted, it is to be understood that I do not intend these to be limiting.

What I claim as new, and desire to secure by Letters Patent of the United States, is:

1. Apparatus comprising a Wheatstone bridge, an electrical supply source for said bridge, a pair of electron discharge devices normally in equilibrium with predetermined plate current, means including an impedance leg of said bridge responsive to a variable for causing a potential of variable polarity to be simultaneously applied to the input circuits of said devices so that one of said devices is selectively rendered more conducting in accordance with the polarity of the potential, a shunt connected direct current electric motor having its armature electrically associated with the output circuits of said devices and having a separately energized direct current shunt field, the armature selectively energized in one direction or the other in accordance with which one of said devices is rendered more conducting than at equilibrium condition, and electric circuit means arranged to decrease the plate current of the other of said devices simultaneously with the said increase in conductance of the one device and by a greater amount than that resulting from the said polarity applied to the input circuit thereof, said circuit comprising biasing means automatically adjusted by change in the plate current of the other discharge device.

2. Apparatus comprising in combination, a balanceable electric network including a variable impedance and a balancing impedance, a source of alternating current for energizing said network, variations in the magnitude of said variable impedance unbalancing said network and causing an alternating current voltage between two points in said network of one phase upon unbalance of said network in one sense and of opposite phase upon unbalance of said network in opposite sense, a pair of electron discharge devices each having an input and an output circuit, the output circuits selectively responsive in accordance with the phase of said alternating current voltage when applied to the input circuits, a direct current motor electrically related to said output circuits and directionally responsive to the space current through said devices for adjusting said balancing impedance to maintain said network in balance, a source of alternating current for said motor, a pair of full wave rectifiers connected for supplying current in opposite directions to a portion of said motor and means to select one or the other of said rectifiers to supply current to the motor in accordance with the flow of space current in said devices.

3. The combination of claim 2 including means comprising cross responsive automatic biasing circuits for rendering one of the devices more conducting and simultaneously rendering the other device less conducting from an equilibrium condition in dependence upon the phase of the alternating current voltage.

4. The combination of claim 2 wherein the direct current motor is of the series type having an armature and two separately energized fields, the armature connected in a common leg of a double loop circuit arranged for current flow in one direction through one field in one loop and in the reverse direction through the other field in the other loop, the loop circuits selectively energized through the agency of said output circuits.

5. The combination of claim 2 wherein the direct current motor is of the series type having a single armature selectively connected in series with one of two field windings for selective directional rotation of the armature, and means sensitive to the space current through said devices selectively connecting the armature and field windings, said armature adjusting said balancing impedance to maintain the network in balance.

6. Apparatus comprising in combination, a balanceable electrical network including a variable impedance and a balancing impedance, a source of alternating current for energizing said network, a pair of control electron discharge devices so connected that their plate potentials are of opposite polarity, said devices so coupled to said network that one or the other of the devices is rendered conducting upon unbalance of the network selectively in dependence upon the sense of unbalance of the network, a motor for adjusting said balancing impedance in a direction to maintain the network in balance, and means including a pair of saturable core reactors for connecting the motor to a source of voltage, said reactors responsive to said control devices for effecting directional energization of the motor.

7. The combination of claim 6 wherein the motor has an armature and a wound field, and said means including the saturable core reactors effects selective directional direct current energization of the field and armature in series for controlling direction of armature rotation.

8. Apparatus comprising a Wheatstone bridge, an alternating current supply source for said bridge, a pair of motor control tubes, means including an impedance leg of said bridge responsive to a variable for causing a potential of variable phase or polarity to be simultaneously applied to the input circuits of said tubes so that one or the other is selectively rendered conducting in accordance with the phase or polarity of the potential, a balancing impedance leg of said bridge, a pair of saturable core reactors associated with said control tubes, the output of each tube supplying saturating current for one of the reactors, and a motor directionally controlled by said reactors and positioning the balancing impedance upon unbalance of said bridge to restore balance.

9. Apparatus comprising in combination, an alternating current Wheatstone bridge, a source of alternating current for the bridge, one leg of said bridge comprising an impedance responsive to a variable condition such as temperature producing a potential of variable phase or polarity in the bridge output circuit, a balancing impedance in a leg of said bridge, a reversible direct current motor arranged to position said balancing impedance, a pair of motor control tubes having input circuits coupled to the bridge output circuit and having alternating current energized anode circuits adapted to control the polarity and magnitude of direct current energization of said motor thereby determining the direction and speed of rotation of said motor dependent upon the phase or polarity of the potential in the bridge output circuit, a pair of thyratrons connected back to back, a source of alternating current and the armature of said motor being connected in series, and means including said anode circuits to oppositely energize the grids of said thyratrons in accordance with the direction and amount of unbalance of said motor control tubes.

10. The combination of claim 9 including an anti-hunting feedback comprising, a condenser and a transformer connected across the motor armature, the output winding of said transformer connected to the grid circuits of said motor control tubes.

11. The combination of claim 9 including an anti-hunting feedback comprising, a condenser and a resistance connected in series across the motor armature and to the grid circuits of said motor control tubes.

12. The combination of claim 9 including an anti-hunting feedback comprising, a tachometer generator driven by and with the motor armature, and an induction coupling between the generator output and the motor control tubes inputs.

13. Apparatus comprising in combination a balanceable electric network including a variable impedance and a balancing impedance, a pair of electron discharge devices each having an input and output circuit, a source of alternating current for energizing said network, variations in the magnitude of said variable impedance unbalancing said network and causing an alternating current voltage between two points in said network of one phase upon unbalance of said network in one sense and of opposite phase upon unbalance of said network in opposite sense, means to associate said alternating current voltage with said input circuits whereby space current flow increases in one or the other of the output circuits dependent on the phase of said alternating current voltage, a pair of saturable core reactors each having a saturating winding responsive to space current flow in one of said output circuits, a direct current motor for adjusting said balancing impedance to maintain the network in balance, a source of alternating current for said motor, a pair of rectifiers arranged to supply current in one or the other direction to a part of said motor to determine its sense of rotation, and means placing said rectifiers selectively under the control of said reactors.

14. Apparatus comprising in combination, a balanceable electrical network including means subject to change of electrical characteristics upon change of condition and a balancing impedance, a source of alternating current for energizing said network, a pair of control electron discharge devices, means coupling said devices to said network so that one or the other is rendered conducting upon unbalance of the network selectively in dependence upon the sense of unbalance of the network, a motor for adjusting said balancing impedance in a direction to maintain the network in balance, and saturable core reactor means associating the motor with the control devices for directional energization of the motor.

15. Apparatus comprising in combination, a balanceable electrical network including means for unbalancing the same on change of conditions and a balancing impedance, a pair of control electron discharge devices, means coupling said devices to said network so that one or the other is rendered conducting upon unbalance of the network selectively in dependence upon the sense of unbalance of the network, a motor for adjusting said balancing impedance in a direction to maintain the network in balance, and saturable core reactor means associating the motor with the control devices for directional energization of the motor.

16. Apparatus comprising in combination, a balanceable electrical network including means for unbalancing the same on change of conditions and a balancing impedance, a pair of control electron discharge devices, means coupling said devices to said network so that one or the other is rendered conducting upon unbalance of the network selectively in dependence upon the sense of unbalance of the network, a direct current motor for adjusting said balancing impedance in a direction to maintain the network in balance, said motor having a separately excited field, an armature, reversely connected rectifiers connecting said armature and a source of alternating current and a saturable core reactor placing each of said control devices in control of one of said rectifiers.

17. Apparatus comprising in combination, a balanceable electrical network including means for unbalancing the same on change of conditions and a balancing impedance, a pair of control electron discharge devices, means coupling said devices to said network so that one or the other is rendered conducting upon unbalance of the network selectively in dependence upon the sense of unbalance of the network, a direct current motor for adjusting said balancing impedance in a direction to maintain the network in balance, said motor having an armature and two fields, a source of alternating current and two rectifiers, means connecting each rectifier in circuit with the armature and one field, a saturable core reactor controlling the energization of each rectifier, and means placing each reactor under the control of one of said control devices.

18. Apparatus comprising a network, a pair of motor control tubes, means in said network subject to change of electrical characteristics upon change of conditions for causing a potential of variable polarity to be simultaneously applied to the input circuits of said tubes so that one or the other is selectively rendered conducting in accordance with the polarity of the potential, a balancing impedance in said network, a motor arranged to adjust the balancing impedance in a direction to restore balance to the network upon unbalance thereof, a pair of saturable core reactors each arranged to control current to the motor to operate it in one direction, each saturable core reactor being associated with one of said control tubes whereby the output of the tube supplies saturating current therefor.

19. Apparatus comprising a Wheatstone bridge, an alternating current supply source for said bridge, a pair of motor control tubes, means including an impedance leg of said bridge responsive to a variable for causing a potential of variable phase or polarity to be simultaneously applied to the input circuits of said tubes so that one or the other is selectively rendered conducting in accordance with the phase or polarity of the potential, a balancing impedance leg of said bridge, a pair of saturable core reactors associated with said control tubes, the output of each tube supply saturating current for one of the reactors, a motor for positioning the balancing impedance upon unbalance of the bridge to restore balance, a source of alternating current, a pair of reversely connected rectifiers associating one element of the motor and said source and means placing each of said reactors in control of one of said rectifiers.

ANTHONY J. HORNFECK.

REFERENCES CITED

The following references are of record in the file of this patent:

UNITED STATES PATENTS

| Number | Name | Date |
| --- | --- | --- |
| 2,333,393 | Ryder | Nov. 2, 1943 |
| 2,277,849 | Fitzgerald | Mar. 31, 1942 |
| 2,310,955 | Hornfeck | Feb. 16, 1944 |
| 2,358,103 | Ryder | Sept. 12, 1944 |
| 2,285,540 | Stein et al. | June 9, 1942 |
| 2,371,236 | Gille et al. | Mar. 13, 1945 |
| 2,293,502 | Hermann | Aug. 18, 1942 |
| 2,275,317 | Ryder | Mar. 3, 1942 |
| 2,203,689 | McDonald | June 11, 1940 |
| 2,287,002 | Moseley | June 16, 1942 |
| 2,234,349 | MacKay | Mar. 11, 1941 |